United States Patent [19]
Grisch et al.

[11] Patent Number: 5,744,077
[45] Date of Patent: Apr. 28, 1998

[54] METHOD FOR FABRICATING A COMPOSITE STRUCTURE

[75] Inventors: William E. Grisch, Elburn; Francis L. Massey, St. Charles, both of Ill.

[73] Assignee: Applied Composites, Corp., St. Charles, Ill.

[21] Appl. No.: 802,689

[22] Filed: Feb. 19, 1997

Related U.S. Application Data

[63] Continuation of Ser. No. 524,818, Sep. 7, 1995, abandoned.

[51] Int. Cl.$^6$ .................... B29C 44/06; B29C 44/12
[52] U.S. Cl. .................... 264/46.6; 264/46.5; 264/161
[58] Field of Search .................... 264/46.5, 46.8, 264/46.6, 161, 553

[56] References Cited

U.S. PATENT DOCUMENTS

| | | | |
|---|---|---|---|
| 3,956,549 | 5/1976 | Stoeberl | 264/46.6 |
| 4,181,301 | 1/1980 | Cholat-Serpoud et al. | 264/46.6 |
| 4,419,307 | 12/1983 | Kohara et al. | 264/46.6 |
| 4,551,290 | 11/1985 | Mizell | 264/46.6 |
| 4,738,809 | 4/1988 | Storch | 264/46.6 |
| 4,839,118 | 6/1989 | Labrie | 264/46.6 |
| 4,992,224 | 2/1991 | Swenson et al. | 264/46.6 |
| 5,098,622 | 3/1992 | Lilienthal et al. | 264/46.6 |
| 5,160,465 | 11/1992 | Soderberg | 264/46.6 |
| 5,173,227 | 12/1992 | Ewen et al. | 264/46.6 |
| 5,275,779 | 1/1994 | Marfilius et al. | 264/46.6 |

FOREIGN PATENT DOCUMENTS 3269080  11/1991  Japan .................... 264/46.6

*Primary Examiner*—Allan R. Kuhns
*Attorney, Agent, or Firm*—Bell, Boyd & Lloyd

[57] ABSTRACT

The invention relates to a method and system for producing a composite structure, consisting of a foam core surrounded by an exterior shell. More specifically, the invention relates to a method of manufacturing a unitary composite article of a desired shape. The method broadly includes fabricating an exterior shell, which can be composed of either a single member or multiple portions, having the desired shape of the composite article. If there are multiple portions, those portions have peripheral edges which allow the portions to be assembled together to form the exterior shell. The exterior shell of the invention defines an internal cavity. A foam reaction mixture is injected into the cavity where it reacts exothermically and expands. During expansion, the foam adheres to the surface of the cavity. Prior to injection of the foam, the exterior shell is positioned within a structural frame which surrounds the shell. The frame resists movement of the exterior shell as the foam reaction mixture expands. Finally, after the foam core is set, the composite article is removed from the structural frame.

12 Claims, 6 Drawing Sheets

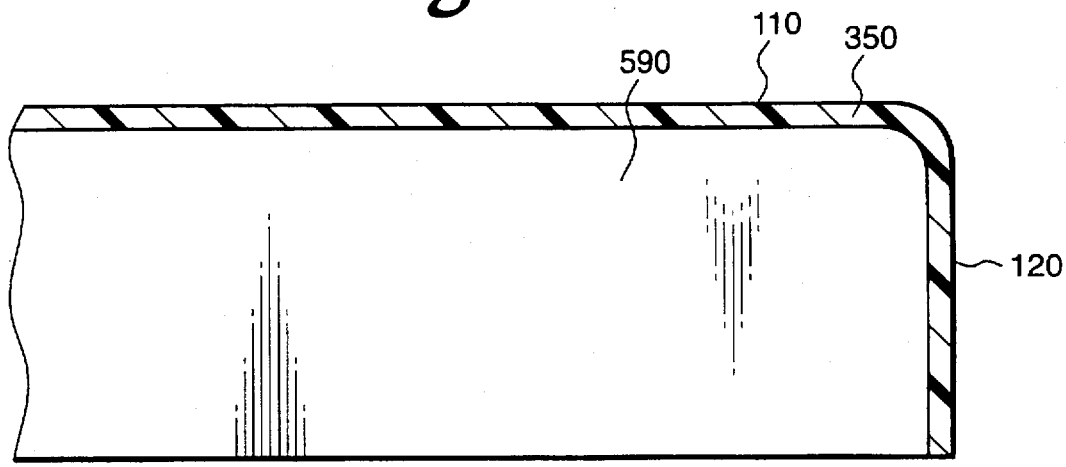
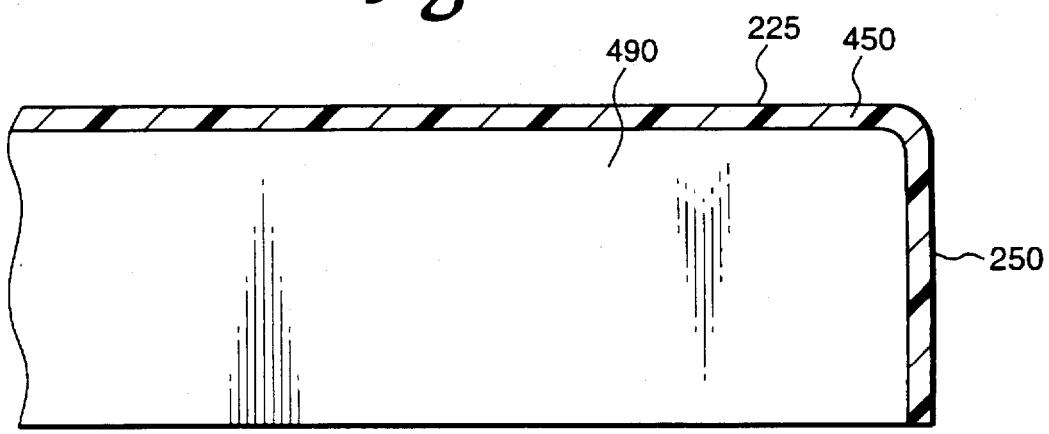

METHOD FOR FABRICATING A COMPOSITE STRUCTURE

This application is a continuation of application Ser. No. 08/524,818, filed Sep. 7, 1995, now abandoned.

BACKGROUND OF THE INVENTION

1. Field of the Invention

The present invention relates to a method and system for fabricating a composite structure. Particularly, the present invention is directed to a method of manufacturing a unitary composite article including a foam core and an outer shell of a desired shape. The method broadly includes fabricating an exterior shell that corresponds to the desired shape of the composite article with the fabricated exterior shell having a cavity therein. A foam reaction mixture is injected into the cavity; a structural frame surrounds the shell to resist movement of the exterior shell as the foam reaction mixture expands to fill the cavity. The composite article is then removed from the structural frame.

2. Description of Related Art

Composite articles with foam cores have many applications including automobile components, building materials, and molded athletic and other equipment, such as skis and the like. Existing methods of fabricating foam core or composite articles differ primarily by how the exterior shells are formed and by how the foam core is created.

There are generally two methods currently used for forming the exterior shell. That is, the exterior shells typically are either provided and maintained as planar sheets or they are provided by spraying or applying to the interior of a mold, where the foam core will be created, the material desired to constitute the exterior shell.

For example, U.S. Pat. No. 3,846,525 discloses one conventional method of fabricating foam sandwich panels for use as building materials, wherein the semi-rigid sheets, which form the exterior shell, can be sheets of plywood, wallboard, aluminum, or the like. The two outer semi-rigid sheets are situated between the sides of an upright press with the sides of the press then clamped so as to form an inner cavity between the semi-rigid sheets. Similarly, U.S. Pat. No. 5,021,108 discloses a method for producing laminated panels where the outer shell materials, either rigid or flexible, are positioned against opposing platen surfaces and held in position by suction. Mold closure members are then positioned around the periphery of the shell materials and the platen surfaces are clamped together at a predetermined spacing to define a cavity between the shell materials. These methods are generally limited to forming an exterior shell of the dimensions and planar shape of the rigid or semi-rigid sheets that are used. Further, rigid or semi-rigid sheets do not have sidewalls, so after the foam core is created, the foam will be exposed along the sides of the composite article.

In a different conventional method, the exterior shell of the composite article is formed in the same mold used to create the foam core. For example, U.S. Pat. No. 5,230,844 describes fabrication of skis or similar molded articles. In that patent, the outer shell is formed by depositing on the mold surface a textile sheet impregnated with epoxy resin. The mold is then closed to define the cavity that will become the foam core. U.S. Pat. No. 3,859,401, discloses a process for forming flat panels, typical of those used for prefabricated homes, by spraying the polyester resin which will form the exterior shell onto the surface of the two mold halves. A method of fabricating automotive components, disclosed in U.S. Pat. No. 4,379,103, forms the shell by placing two absorbent flexible sheets within a mold. When the foam is injected into this type of mold, the foam expands the sheets against the opposed mold surfaces. The exterior shell is formed simultaneously with the foam core. With these conventional methods, however, there is a lack of good control over the final density of the foam core. Because the exterior shell in these examples is pliable, the density of foam in the finished composite article could be uneven.

While composite articles formed using current approaches have many practical applications, these approaches have certain limitations with respect to the formation of the exterior shell. With regard to the shells formed of semi-rigid sheets, there often are no sidewalls to completely enclose the foam core. If a sidewall is desired, then a separate member must be positioned between the planar sheets, thus increasing the time and expense of fabrication. Alternatively, exterior shells formed by the force of the foam mixture pushing a flexible material against the walls of a mold frequently do not have uniform wall thickness because the foam will expand along the path of least resistance and do not have uniform density across the foam core.

The strength of composite articles can be measured by determining the amount of deformation under a compression force and by determining the tensile force necessary to tear the article. In order to add strength for improved load-bearing capability, composite articles of the prior art have used support materials, such as ribs, for reinforcement purposes. Essentially, ribs are used to reduce weight, increase stiffness, and load bearing characteristics. Another factor affecting the use of composite articles is durability. The durability of such articles is determined by how well the exterior shell remains adhered to the foam core and, if the exterior shell has more than one component, how well the exterior shell components remain adhered to each other. For example, composite articles that are fabricated from semi-rigid planar sheets typically have exposed edges, which increase the likelihood of separation of the outer sheets from the foam core, and thus decrease durability.

In view of the above, there remains a need for a more efficient method and system for fabricating composite articles having increased strength and durability over the composites fabricated by the conventional methods.

SUMMARY OF THE INVENTION

The purposes and advantages of the invention will be set forth in and apparent from the description and drawings that follow, as well as will be learned by practice of the invention as described herein. Additional advantages of the invention will be realized and attained by the elements of the method and system particularly pointed out in the appended claims.

In particular, however, the invention overcomes the deficiencies of the prior methods of forming composite articles. Composite articles formed by the present invention advantageously have an enclosed foam core of uniform density because the exterior shell components are molded prior to injection of the foam reaction mixture. As a result, the invention has improved compression and tensile and bending strength and improved durability. In addition, the invention has increased stiffness with reduced or equal weight.

To achieve these and other advantages and in accordance with the purpose of the invention, as embodied and broadly described herein, a novel method and system of fabricating a composite article are provided. The method comprises a first step of fabricating an exterior shell corresponding to the desired shape of the composite article. The exterior shell has an inner surface which defines a cavity. The exterior shell is positioned within a structural frame. A foam reaction mixture is injected into the cavity defined by the exterior shell, and as the foam reaction mixture expands, it fills the cavity and adheres to the inner surface of the exterior shell. The structural frame withstands the pressure created by the expanding foam and maintains the desired shape of the composite article. Finally, the composite article is removed from the structural frame.

In a preferred embodiment of the present invention, the exterior shell is fabricated as two or more exterior shell portions having peripheral edges. The peripheral edges of the various shell portions can be matched together to form a unitary shell defining the internal cavity and the desired shape of the article. The exterior shell is formed of either thermoplastic, thermosetting, or a like material. If a thermoplastic material is used, it can be either vacuum-drawn or blow-molded into the desired shape of the composite article. If a thermosetting resin is used, it is compression-molded into the desired shape. Alternatively, injection molding or a similar technique may be used for fabrication of the exterior shell. The foam reaction mixture is comprised of two primary components, preferably a polyurethane polyol and an isocyanate. When these components are mixed, they react exothermically and expand to fill the cavity defined by the assembled exterior shell portions. The foam adheres to the interior surfaces of the exterior shell, thus forming a unitary structure.

Practice of the present invention includes the fabrication of, for example, basketball backboards, garage doors, residential doors, truck trailer doors, office partitions, and office tables and other useful consumer products and goods.

It is therefore a broad objective of the present invention to provide a method for increasing the strength and durability of composite articles. It is another objective of the invention to provide a method for completely enclosing the foam core of the composite article. It is another objective of the invention to provide a method for obtaining a composite article having a uniform density across the foam core, together with providing a composite article having a uniform foam core density. It is a further objective of the invention to provide a method for fabricating a composite article using either a single part or several parts.

These and other objectives of the present invention are attained by a foam-in-place system inserted into a cavity formed by one or more shell portions comprising a formed thermoplastic or a thermoset material creating a structural load bearing member when the liquid foam expands and cures into a solid unitary structure. The foam stabilizes the exterior shell for increased load carrying capabilities. The invention advantageously provides a method of filling a void and adding strength to the part without the addition of ribs or raised areas to the exterior shell, as well as eliminating the bonding adhesives required to join two or more shell portions together for a unitary structural member.

It is to be understood that both the foregoing general description and the following detailed description are exemplary and provided for purposes of explanation only, and are not restrictive of the invention, as claimed.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

FIG. 3. shows a cross-sectional view of the outer exterior shell portion along lines 3—3 depicted in FIG. 1A.

FIG. 4. shows a cross-sectional view of the inner exterior shell portion along lines 4—4 depicted in FIG. 2A.

DETAILED DESCRIPTION OF THE PREFERRED EMBODIMENT

Figure 1A:
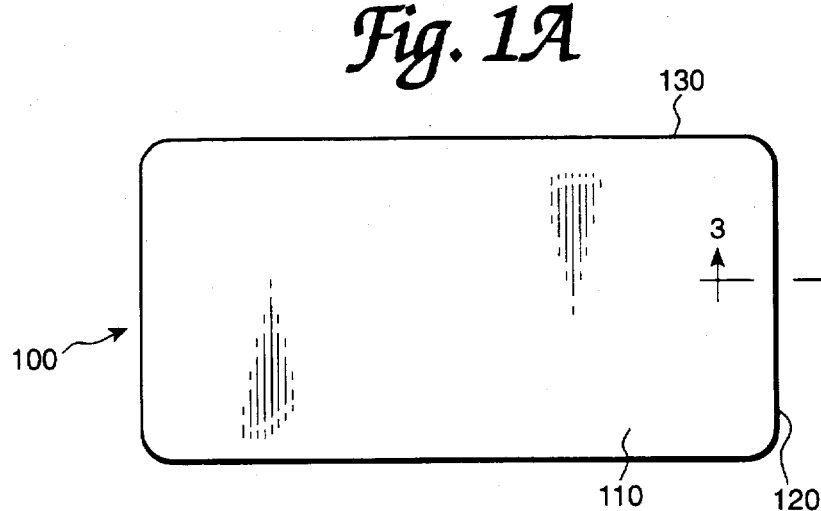
FIGS. 1A–1C show front, side and top views of an exemplary outer exterior shell portion, respectively, when two or more exterior shell portions are used to form the composite article.

Reference will now be made in detail to the present preferred embodiment of the method and system of fabricating a composite structure of the invention examples of which are illustrated in the accompanying drawings. Wherever possible, the same reference characters will be used throughout the drawings to refer to the same or like parts.

The method of the present invention, for producing a composite article including a core of polyurethane foam surrounded by an exterior shell includes the steps of: first, premolding a thermoplastic, thermoset, or other suitable material into an exterior shell having the desired shape of the composite article; second, positioning the exterior shell within a structural frame so that an internal cavity is formed; third, providing an aperture through the exterior shell, if one is not naturally present, for the injection of a foam reaction mixture; fourth, injecting the foam reaction mixture into the cavity; and finally, after the reaction mixture expands and adheres to the exterior shell such that the composite article sets, removing the composite article from the structural frame. The exterior shell material is selected such that the foam reaction mixture, upon setting, will adhere to it. The volume of the cavity formed by the exterior shell corresponds to the volume of the foam core of the composite article. In the preferred embodiment, the foam reaction mixture has two components, a polyurethane polyol and an isocyanate, which react exothermically, expand against the exterior shell, and then harden in situ.

The exterior shell of the present invention is pre-molded and composed of a thermoplastic, thermoset, or similar material. The exterior shell may be fabricated as a single-piece member, or molded as two or more portions for greater manufacturing flexibility. The exterior shell is molded into the desired shape of the composite article. If two or more exterior shell portions are used, the shell portions are molded into shapes that, when fitted together, form the desired shape of the composite article.

The method therefore begins with the molding of the exterior shell using thermoplastic, thermoset, or another suitable material. If a thermoplastic material is used, a thermoplastic sheet is heated to a temperature just below the melt temperature of the thermoplastic material. The sheet preferably is placed over or into a mold and formed to the mold contour by vacuum and/or pressure. Upon cooling, the sheet is removed and trimmed to the required dimensions for a shell. If a thermoset material is used, a thermoset shell preferably is formed by compression molding process at an elevated temperature, using a mixture of resin blended with fibers, reinforcement, catalyst, etc., known as sheet molding compound or batch molding compound. The shell is molded to the nominal dimensions and deflashed as required. Alternatively, injection molding or a similar technique may be used for fabricating the exterior shell.

Figure 1B:
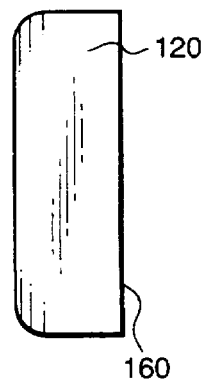
Figure 1C:
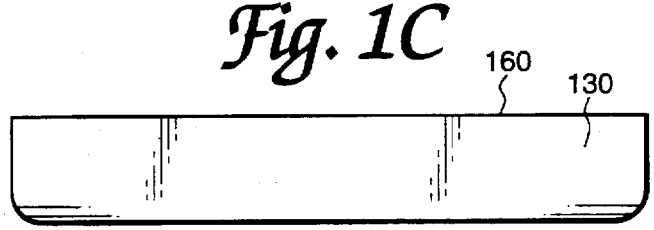
Figure 2A:
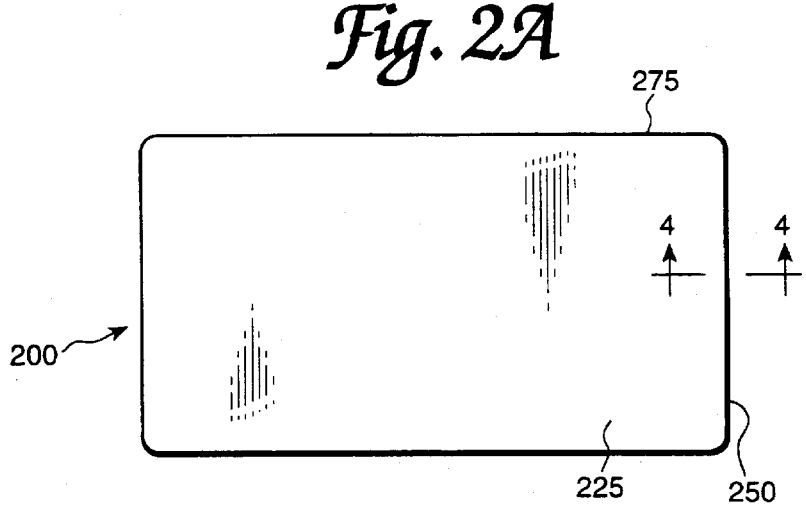
FIGS. 2A–2C show front, side and top views of an exemplary inner exterior shell portion, respectively, corresponding to the outer exterior shell portion depicted in FIGS. 1A–1C.
Figure 2B:
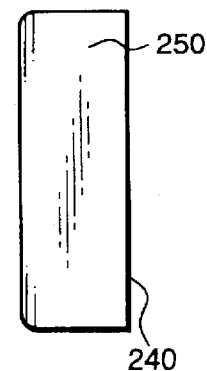
Figure 2C:

For purpose of illustration, FIGS. 1 and 2 depict two portions that are assembled together to form the exterior shell 150 in accordance with the present invention. In FIGS. 1A–1C, an exemplary outer exterior shell portion 100 is depicted. The outer exterior shell portion 100 has a base wall 110 and sidewalls 120 and 130. FIGS. 2A–2C depict an inner exterior shell portion 200 corresponding to the outer exterior shell portion 100. The inner exterior shell portion 200 has a base wall 225 and sidewalls 250 and 275. Inner exterior shell portion 200 is configured such that its peripheral edge 240 can be received within the confines of the peripheral edge 160 of the outer exterior shell 100. FIG. 3 shows a cross-sectional view of the outer exterior shell portion 100 along line 3—3 of FIG. 1A. The outer exterior shell portion 100 has an inner surface 590 and a sidewall thickness 350. The sidewalls 120 and 130 of the outer exterior shell portion 100 have inner and outer surfaces. The inner surface 590 is continuous across sidewalls 120 and 130. FIG. 4 shows a cross-sectional view of the inner exterior shell portion 200 along line 4—4 of FIG. 2A. The inner exterior shell portion 200 has an inner surface 490 and a sidewall thickness 450. The sidewalls 250 and 275 of the inner exterior shell portion 200 have inner and outer surfaces. The inner surface 490 is continuous across sidewalls 250 and 275. The exterior shell 150 therefore has a thickness and two surfaces: the inner surface to which the foam reaction mixture will adhere and the outer surface which will be the exposed side of the composite article. The thickness of the exterior shell 150 can vary along the perimeter of the shell, although a uniform thickness is preferred.

Further with regard to the representative embodiment of FIGS. 1 through 4, the inner 200 and outer 100 shell portions are of a generally planar shape having three dimensions; the shell portions 100 and 200 are molded to form a generally two dimensional planar surface with a continuous peripheral sidewall seamlessly formed along the perimeter of the plane (forming the third dimension). The shell portions 100 and 200 fit together either by overlapping the peripheral edges 160 and 240 of the sidewalls or by interlocking the peripheral edges 160 and 240 of the sidewalls, as will be discussed. When assembled together, the exterior shell 150 defines a cavity and the desired shape of the composite article. When two or more exterior shell portions are used, as in the embodiment of FIGS. 1 through 4, each shell portion is molded so that the peripheral edges of the shell portions can be assembled together. One preferred way the shell portions 100 and 200 can be assembled together is if the peripheral edge of the inner shell portion has dimensions slightly smaller than that of the outer shell portion, so as to create an overlapping engagement therebetween. This configuration will result in a seam along the composite article where the shell portions are connected. Another way the shell portions can be assembled together is to configure the peripheral edge of the inner shell portion so that it interlocks with the peripheral edge of the outer shell portion to form a seamless connection.

Figure 5:
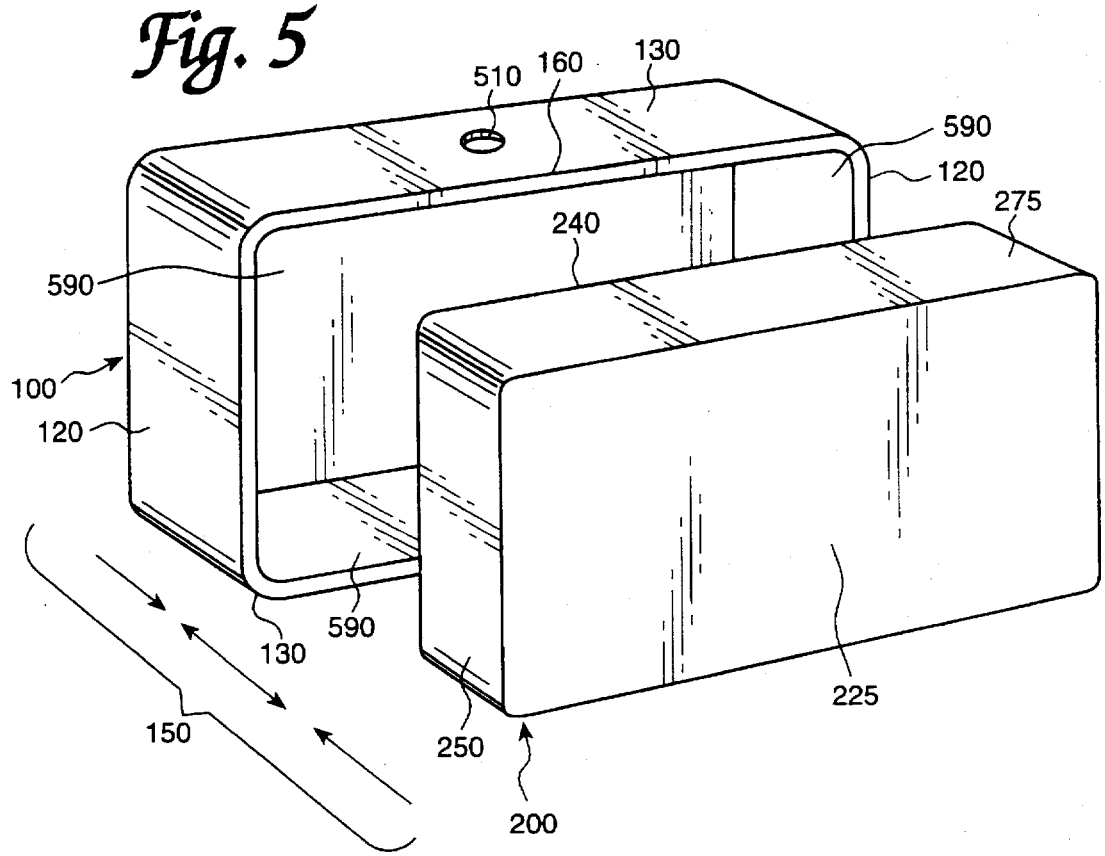
FIG. 5. shows the outer and inner exterior shell portions positioned in relation to each other so that the inner exterior shell portion can be fitted into the outer exterior shell portion.
Figure 6:
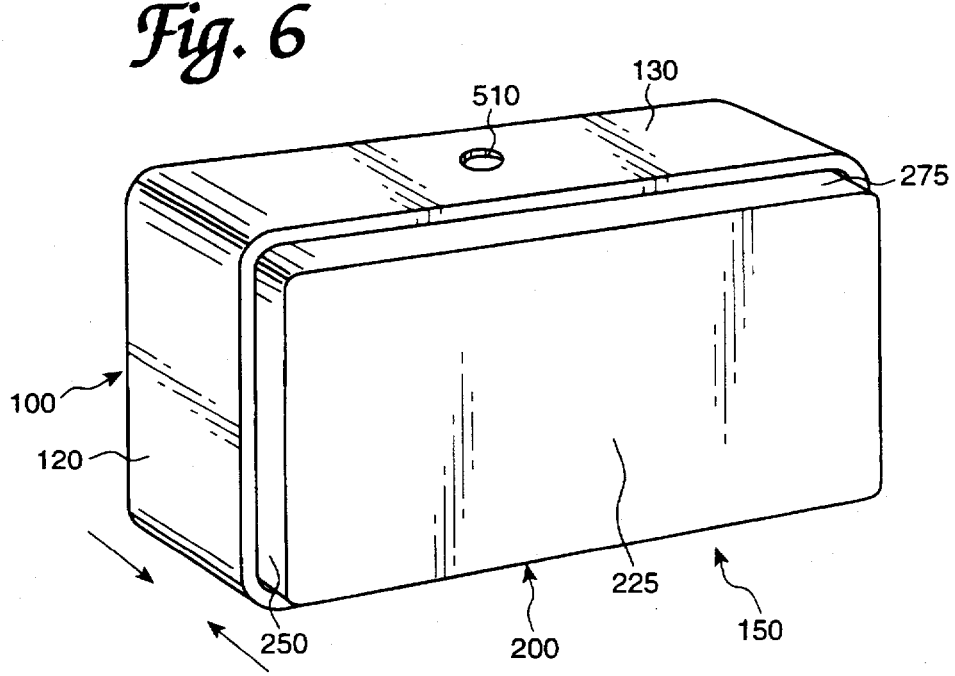
FIG. 6. shows the outer and inner exterior shell portions in relation to each other after the inner shell portion is fitted into the exterior shell portion.

For example, FIG. 5 shows the outer and inner exterior shell portions 100 and 200 positioned in relation to each other before the peripheral edge 240 of the inner exterior shell portion 200 is inserted into the outer exterior shell portion 100. The inner surface 590 of the outer exterior shell portion 100 is visible. On the inner exterior shell portion 200, only the outer surfaces of sidewall 250 and sidewall 275 are visible as shown in FIG. 5. On the outer surface of sidewall 130 of the outer exterior shell portion 100 an aperture 510 is visible. The aperture 510 is cut into the sidewall 130 of the outer exterior shell portion 100 so that a dispenser for injecting the foam reaction mixture can be inserted as will be discussed. FIG. 6 depicts the outer and inner exterior shell portions 100 and 200 in relation to each other after the inner exterior shell portion 200 has been inserted into the outer exterior shell portion 100. The vertical 250 and horizontal 275 sidewalls of the inner exteriors shell portion 200 end up fitted against the inner surfaces of the corresponding vertical 120 and horizontal 130 sidewalls of the outer exterior shell portion 100. The distance into outer exterior shell portion 100 that inner exterior shell portion 200 is inserted depends on the width desired in finished composite article.

Alternatively, the peripheral edges and sidewalls of the inner exterior shell portion 100 may be configured to interlock with the peripheral edges and sidewalls of the outer exterior shell portion 200. In this case, the distance of overlap between the shell portions will be limited by the interlocking design of the sidewalls. Examples of various sidewall configurations for an exterior shell made up of more than one shell portion are shown in FIGS. 10A–10C and 11.

Figure 10A:
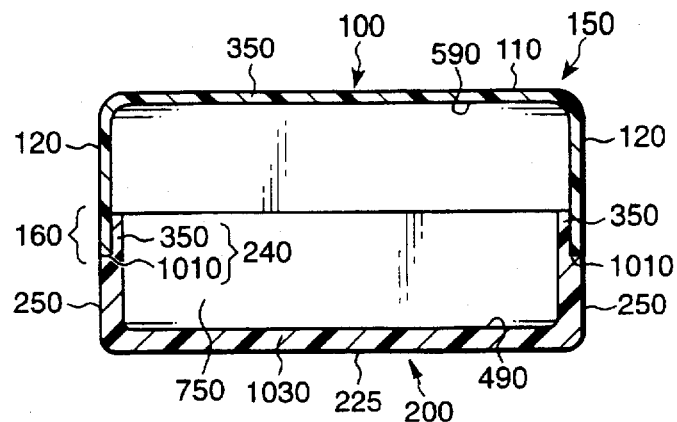
FIGS. 10A–10C show various configurations of fitting two exterior shell portions together by having sidewalls with interlocking perimeters to form a seamless connection.
Figure 10B:
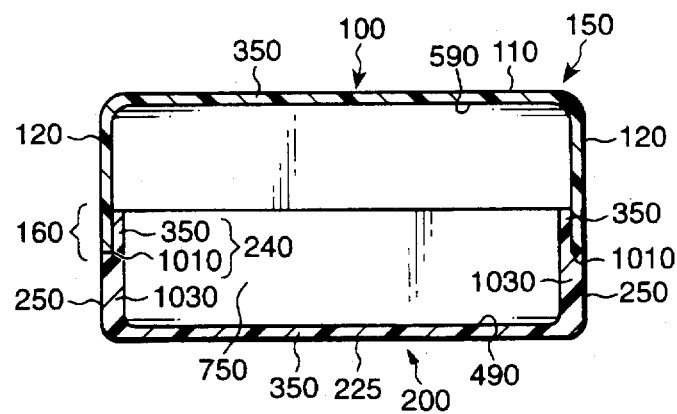
Figure 10C:
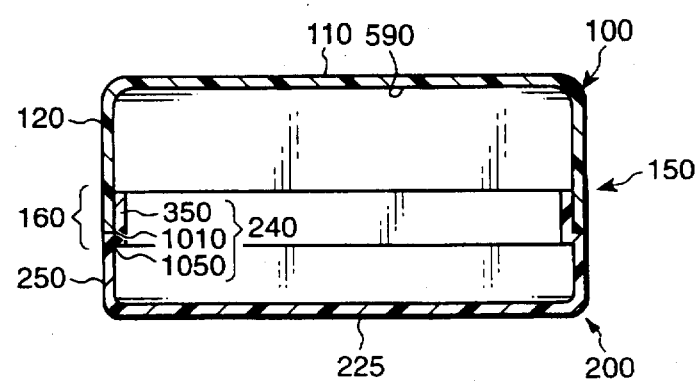

In particular, FIGS. 10A–10C depict various possible configurations for the peripheral edges 160 and 240 of the exterior shell portions so that the connection therebetween is seamless. The basic principle is to vary the shape and wall thickness of the sidewalls 250 and 275 of the inner exterior shell portion 200 so as to interlock the peripheral edge 240 of the sidewalls 250 and 275 with the peripheral edge 160 of the sidewalls 120 and 130 of the outer exterior shell portion 100. In FIG. 10A, the wall thickness 1030 of the inner exterior shell portion 200 is twice the wall thickness 350 of the outer exterior shell portion 100, except at the peripheral edge 240 of the sidewalls 250 and 275 that interlocks with the peripheral edge 160 of the sidewalls 120 and 130. The interlocking peripheral edge 240 has a single wall thickness 350 equivalent to that of the wall thickness 350 of the outer exterior shell portion 100. The change in wall thickness along the sidewalls 250 and 275 of the inner exterior shell portion 200 therefore forms a notch 1010 into which the sidewalls 120 and 130 fit. The result is a seamless fit between the two exterior shell portions. FIG. 10B depicts a similar configuration for interlocking the shell portions. However, in this case, sidewalls 250 and 275 have the double wall thickness 1030 and base wall 225 has the single wall thickness 350. As before, the connection between sidewalls 120 and 250 is seamless. In FIG. 10C a third possible configuration for interlocking the shell portions is shown. In this case, the base wall 225 and sidewalls 250 and 275 of the inner exterior shell portion 200 have the single wall thickness 350 throughout. The interlocking configuration is formed by the two notches 1010 and 1050, which causes the peripheral edge 240 of the sidewalls 250 and 275 effectively to wrap around the peripheral edge 160 of sidewalls 120 and 130.

Figure 11:
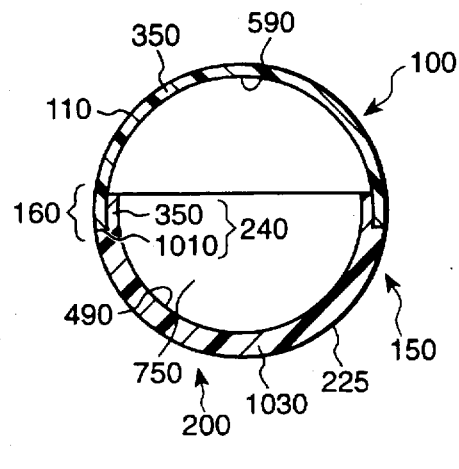
FIG. 11 shows an embodiment of the invention where the exterior shell portions define a circular shape.
Figure 12:
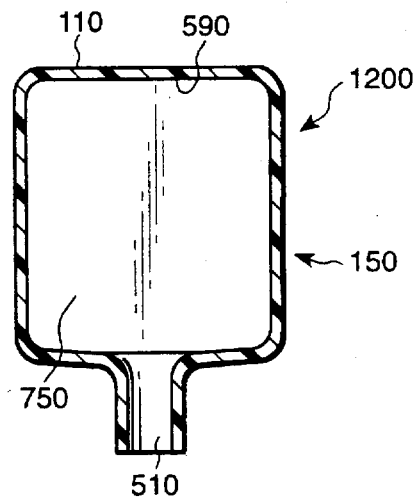
FIG. 12 shows an embodiment of the invention wherein the exterior shell is formed as a single piece.

Further in accordance with the present invention, FIG. 11 depicts another possible embodiment where the outer exterior shell portion 100 and the inner exterior shell portion 200 are semi-circular. When the shell portions 100 and 200 are assembled together, they form a circular exterior shell 150. In each of FIGS. 10A–10C and 11, the shell portions 100 and 200, when assembled, define a cavity 750 therein. FIG. 12 alternatively depicts an embodiment where the exterior shell 150 is fabricated as a single-piece member with a cavity 750 defined therein. There is also an aperture 510 located arbitrarily along the exterior shell 150 into which the nozzle used to inject the foam reaction mixture can be inserted, as will be described.

Figure 13A:
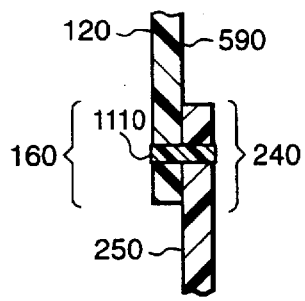
FIGS. 13A–13C show reinforcement of the connection between the interlocking sidewalls of two exterior shell portions which have been fitted together.
Figure 13B:
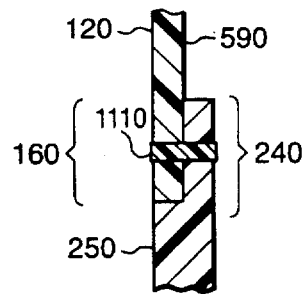
Figure 13C:
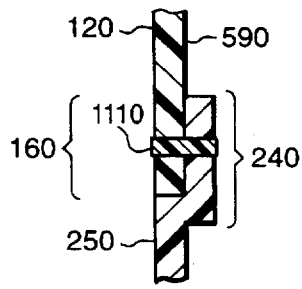

In accordance with an additional aspect of the present invention, a reinforcement may be provided when two or more exterior shell portions 100 and 200 are fitted together either by overlapping or interlocking of the peripheral edges 160 and 240. That is, the connection between the shell portions 100 and 200 can be reinforced with a material either deposited along the connection or with one or more cylindrically-shaped articles inserted through the thickness of the shell portions. If a cylindrical article, such as a pin or bolt, is used to reinforce the connection of the shell portions, holes in the shells can be either pre-formed or created by force upon insertion. FIGS. 13A–13C depict the interlocking peripheral edges 160 and 240 of the sidewalls 120 and 250 from corresponding FIGS. 10A–10C. The interlocking peripheral edges 160 and 240 of the sidewalls 120 and 250 are reinforced either by applying a bonding substance along the connection or by inserting the cylindrical articles 1110 through the sidewalls 120 and 250. A hole into which the cylindrical article 1110 can be inserted can either be pre-formed or formed by the insertion of the cylindrical article 1110 through the sidewalls 120 and 250.

In each embodiment described above, an aperture is provided through the exterior shell 150, if one doesn't already exist after the shells are fitted together, for the insertion a nozzle used to inject the foam reaction mixture into the defined cavity. The aperture may be provided during fabrication of the exterior shell, or provided separately such as by drilling.

The preferred foam reaction mixture that is injected through the aperture is comprised of primarily two components, such as a polyurethane polyol and an isocyanate. The polyurethane polyol used in the reaction mixture is in liquid form, such as is supplied by Dow Plastics or Miles, Inc. The isocyanate used in the reaction mixture is also in liquid form, such as is also supplied by Dow Plastics or Miles, Inc. The foam reaction mixture components, polyurethane polyol and the isocyanate, are mixed together upon injection into the cavity formed within the exterior shell 150. The components are exposed to in line dynamic mixing for 1–10 seconds at room temperature. The viscosity of the foam reaction mixture prior to reaction and expansion is 100–2000 centipoise.

The polyurethane polyol can comprise 40 to 60 weight percent of the foam reaction mixture. A more preferred range of polyurethane polyol in the mixture is 45 to 55 weight percent, although the most preferred weight percentage of polyurethane polyol is 50 percent. The isocyanate can comprise 40 to 60 weight percent of the foam reaction mixture. A more preferred range of isocyanate in the mixture is 45 to 55 weight percent, but the most preferred weight percentage of isocyanate is 50 percent.

In addition to the polyurethane polyol and isocyanate components of the foam reaction mixture, certain other compounds may be added to improve the functionality of the foam. The additives may include, but are not limited to, surfactants, catalysts, and blowing agents. If a surfactant is added, it could comprise 1 to 5 weight percent of the mixture. An example of a catalyst substance, which accelerates the exothermic reaction of the foam reaction mixture, that could be added to the foam reaction mixture is an amine mixture. If a catalyst is added, it could comprise 0.5 to 3 weight percent of the mixture. An example of a blowing agent that could be added to the foam reaction mixture to improve flow, reduce nozzle clogging, and allow for better foam mixture distribution when the foam is injected into the cavity formed by the shell is water. A blowing agent could comprise 1 to 5 weight percent of the foam reaction mixture.

The foam reaction mixture will bond to most thermoplastic materials, but a corona treatment can be applied to the materials, which have lubricity characteristics for bonding purposes; for thermoset materials, the foam will bond without additional treatment. The corona treatment is applied to the surface of the thermoplastic exterior shell that will contact the foam prior to injection of the foam reaction mixture.

Using the present method, a foam density of from about 2 to about 60 pounds per cubic foot can be achieved. Because foam strength properties increase as the density increases, the present invention provides a method of tailoring the composite article so produced to the desired structural load bearing requirements. Regardless of the foam density desired, because the foam is injected into a cavity formed by a pre-molded exterior shell 150, a uniform density of the foam is achieved.

A structural frame is used to hold the exterior shell 150 in a fixed position while the foam reaction mixture is injected into the cavity 750 formed by the shell 150. If there are two or more exterior shell portions 100 and 200 that are fitted together, the structural frame maintains their position in relation to each other while the foam is injected. So that the uniform foam core density and desired shape of the composite article are achieved, the structural frame must resist motion of the exterior shell 150 that could be caused by the expansion of the foam reaction mixture. Preferably, the structural frame is constructed of steel, aluminum, epoxy or any similar material and is contoured to mate with the outer surface of the exterior shell 150. Although not required, it is preferred that complete surface contact between the structural frame and the outer surface of the exterior shell 150 is provided. Alternatively, a rib or open frame construction may be used.

Figure 7:
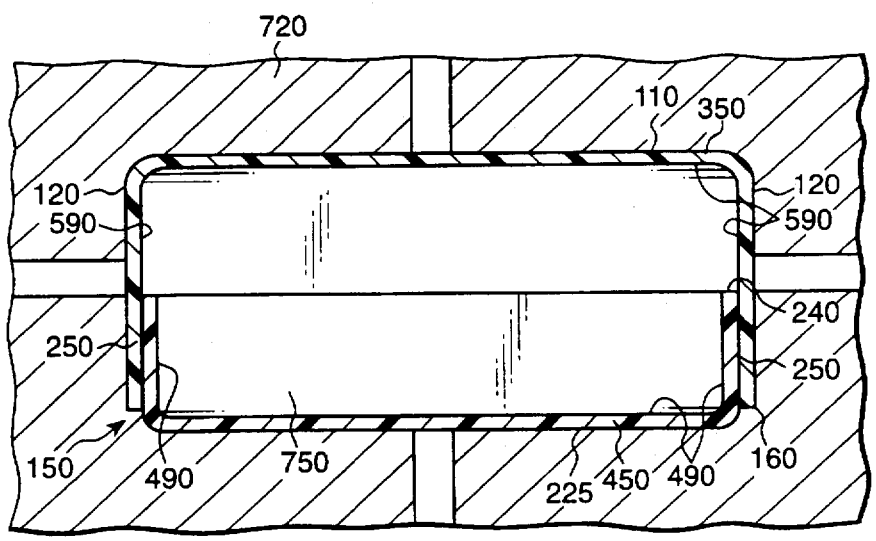
FIG. 7. shows a top, cross-sectional view of FIG. 6 where the exterior shell portions are positioned within the structural frame before the liquid foam is injected.

For purpose of illustration, FIG. 7 shows a cross-sectional view, of FIG. 6, of the assembled outer 100 and inner 200 exterior shell portions in the structural frame 720 before the liquid foam is inserted. The wall thicknesses 350 and 450 of the outer 100 and inner 200 exterior shell portions, respectively, can be seen. Also, the inner surfaces 590 and 490 of both exterior shell portions are visible. For the outer exterior shell portion 100 the sidewall 120 has an inner surface 590. For the inner exterior shell portion 200, the sidewall 250 has an inner surface 490. Similarly, for the outer exterior shell portion 100, the base wall 110 has an inner surface 590 and for the inner exterior shell portion 200 the base wall 225 has an inner surface 490.

The shell portions 100 and 200 are placed in a structural frame 720, which will resist the internal pressures developed by the foam reaction mixture's expansion and will maintain the required contour of the final composite article. With the shell portions 100 and 200 placed into the structural frame 720, an exterior shell 150 having an internal cavity 750 is formed. Aperture 510 is formed on the edge for insertion of the dispensing nozzle.

The structural frame 750 does not obstruct the aperture 510 into which the dispensing nozzle is inserted. The nozzle dispenses the foam reaction mixture into the cavity 750 formed through the exterior shell 150. The design of the nozzle can be any of those known in the art but is preferably a tube-style nozzle.

There are several methods that can be used to dispense the foam reaction mixture into the cavity 750 formed by the shell 150. One method is to blow the foam reaction mixture into the cavity 750. Blowing herein refers to mixing the foam reaction mixture in order to force the foam through the nozzle. The type of equipment used to blow the foam reaction mixture is of the type generally known, for example metering, mixing, and dispensing machines. Another method for dispensing the foam reaction mixture into the cavity 750 formed by the exterior shell 150 is to pump the mixture through the nozzle. Because of the viscosity of the foam reaction mixture, a piston type of pump, known in the industry, would be desirable. The third method for dispensing the foam reaction mixture is to pour the mixture through the nozzle inserted into the aperture 510. The equipment needed to accomplish the pouring method is a Cowles Mixer. All three methods result in a core having a uniform density.

Figure 8:
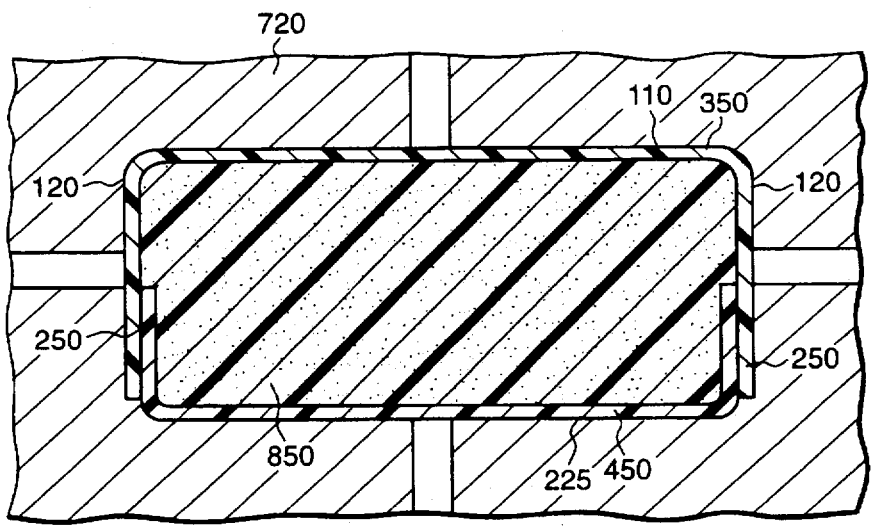
FIG. 8. shows a top, cross-sectional view of FIG. 6 where the exterior shell portions are positioned within the structural frame after the liquid foam has been injected.

The liquid foam, composed of polyurethane polyol and isocyanate, is metered, mixed in-line and dispensed into the shell cavity 750. The dispensing time has been determined based upon the output of the metering system, the volume of the cavity to be filled, and the density of the foam required. Upon mixing the polyurethane polyol and isocyanate components generate heat which creates a foaming action that expands to fill the cavity 750. FIG. 8 shows the exterior shell 150 in the structural frame 720 after the foam core 850 has been injected.

The dispensing time for injection of the foam reaction mixture is calculated based on the output of the metering system, the volume of the cavity 750, and the desired final foam density. The variables are related linearly to each other. For example, doubling the volume of the cavity 750 requires either doubling the dispensing time or the output of the metering system to result in the same final density. The output of the metering system is typically in the range of 1 to 30 lbs/min. The cavity volume is determined by measuring the dimensions of the exterior shell 150 (for two or more shell portions 100 and 200, the volume is measured after the shell portions 100 and 200 are assembled together), accounting for the wall thickness of the shell 150. The desired foam density is selected based on the application for which the finished composite article will be used.

After injection, the mixing reaction of the foam reaction mixture components, polyurethane polyol and isocyanate, is exothermic. The release of energy and consequent rise in temperature causes the expanding foam to adhere to the inner surfaces 490 and 590 of the exterior shell portions 100 and 200. The release of energy is such that a strong bond between the foam core 850 and the inner surfaces 490 and 590 of the shell portions 100 and 200 is formed.

Figure 9:
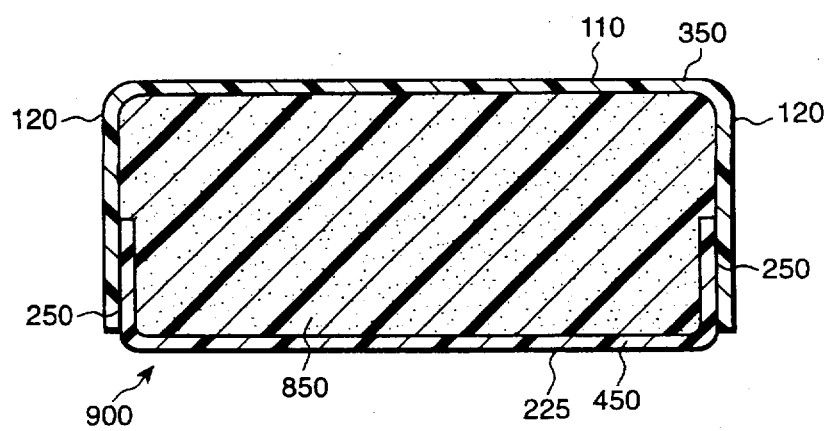
FIG. 9. shows the finished composite article composed of the exterior shell portions and the foam core.

Upon cooling, the composite article 900 is removed from the structural frame 720, prepared, and packed for shipping. FIG. 9 shows the finished composite article 900 after the foam core 850 has been injected and the article 900 has been removed from the structural frame 720.

The strength of composite articles is measured by their ability to resist deformation upon application of a compressive force and their ability to maintain integrity when a tensile force is applied. The method of measuring the compressive force which the composite article 900 can withstand is to uniformly apply a progressively greater force to the exterior of the composite article 900 while measuring the degree of deformation. The method of measuring the tensile force which the composite article 900 can withstand is to apply a progressively increasing tensile force until the article loses its integrity. The durability of composite articles is measured by how well the materials remain adhered to each other. That is, at what point in the cycle of use does the exterior shell 150 begin to pull away from the foam core 850 such that the composite breaks down and the article 900 loses its functionality. The method for measuring the durability of composite articles is to use them continuously and determine the time of breakdown or expose them to forces that would tend to work against the shell 150 remaining adhered to the core 850.

Using the method of the invention described in detail above, one possible composite article that may be formed is as a basketball backboard. Particularly, backboards formed by the method of the invention have demonstrated the properties of improved stiffness, improved rebound characteristics, better dynamic response, and increased strength.

In view of the description above, it is evident that the present invention provides a composite article with improved strength and durability and a uniform density of foam across the core. The method of the present invention is simple and inexpensive yet provides enhanced efficiency while reducing the material and operating costs.

Although reference has been made to the use of the present invention with a polyurethane foam-in-place system for the purpose of explanation, it is understood that alternative foam-in-place systems likewise may benefit from the present invention.

While the foregoing representative embodiments and details have been shown for the purpose of illustration and invention, it will be apparent to those skilled in the art that various changes and modifications may be made therein without departing from the spirit or the scope of the invention. It is intended that all such changes and modifications will be embraced within this invention, provided they fall within the appended claims. It is intended that the specification and examples be considered as exemplary only, with the true scope and spirit of the invention being indicated by the following claims.

What is claimed is:

1. A method of manufacturing a composite structural article having a desired shape, the method comprising the steps of:

a) premolding a rigid non-metallic, plastic exterior shell corresponding to the desired shape of the composite structural article and having at least two ends, the exterior shell also having an inner surface defining a cavity therein, and means formed as part of said exterior shell for interlocking said at least two ends to create a seamless outer surface of said exterior shell, said means for interlocking said at least two ends comprising varied wall thicknesses of the shell at said ends;

b) interlocking said at least two ends;

c) applying to the premolded exterior shell structural means for prohibiting deformation of said exterior shell;

d) injecting a foam reaction mixture into the cavity such that the foam reaction mixture expands and fills the cavity and adheres to the inner surface of the exterior shell to create the composite structural article with a foam core of uniform density, the structural means withstanding pressure induced by the expanding foam and maintaining the desired shape of the composite structural article; and e) separating the composite structural article from the structural means.

2. The method of claim 1, wherein the premolding step includes molding two or more exterior shell portions, each portion having a peripheral edge matching peripheral edges of remaining portions of the exterior shell; and assembling the portions to form the exterior shell corresponding to the desired shape of the composite article by setting the peripheral edges of the portions together.

3. The method of claim 2 wherein each portion of the exterior shell is molded during the molding step from sheet material into a contoured member having a peripheral sidewall with the peripheral edge of the portion located thereon.

4. The method of claim 2, wherein the peripheral edges of the exterior shell portions are configured to overlap when assembled together.

5. The method of claim 1, wherein the premolding step includes heating a thermoplastic resin almost to a melting temperature, vacuum drawing the thermoplastic resin in a mold to form the desired shape of the composite article, and then cooling the thermoplastic resin.

6. The method of claim 1, wherein the premolding step includes heating a thermoplastic resin almost to a melting temperature, blow molding the thermoplastic resin in a mold to form the desired shape of the composite article, and then cooling the thermoplastic resin.

7. The method of claim 1, wherein the premolding step includes heating a thermoset material almost to a curing temperature; compressing the thermoset material within a mold to form the desired shape of the composite article, and then cooling the thermoset material.

8. The method of claim 7, wherein the premolding step further includes deflashing the thermoset material.

9. The method of claim 1, wherein the foam reaction mixture is comprised of a first component and a second component, mixture of the first and second components creating a temperature increase causing adhesion with the inner surface of the exterior shell.

10. The method of claim 9, wherein the first component is a polyurethane polyol.

11. The method of claim 9, wherein the second component is an isocyanate.

12. The method of claim 9, wherein the foam reaction mixture further includes an additive selected from the group consisting of surfactant, catalyst, and blowing agent.

* * * * *